(12) United States Patent
Woonton et al.

(10) Patent No.: US 11,213,047 B2
(45) Date of Patent: Jan. 4, 2022

(54) FOOD COMPOSITION HAVING A HIGH PLANT PROTEIN CONTENT AND METHODS FOR MAKING THE SAME

(71) Applicant: MARS, INCORPORATED, Mclean, VA (US)

(72) Inventors: Brad Woonton, Wodonga (AU); John Carney, Portland, OR (US); Paul Jones, Leicestershire (GB); Apiporn Adulpichit, Lamlukka (TH); Mathuros Ruangwan, Pakchong (TH); Ken Quail, North Ryde (AU); Mathew Rees, Macquarie Park (AU); John Kalitsis, Sydney (AU)

(73) Assignee: MARS, INCORPORATED, Mclean, VA (US)

( * ) Notice: Subject to any disclaimer, the term of this patent is extended or adjusted under 35 U.S.C. 154(b) by 316 days.

(21) Appl. No.: 16/333,925

(22) PCT Filed: Sep. 15, 2017

(86) PCT No.: PCT/EP2017/073358
§ 371 (c)(1),
(2) Date: Mar. 15, 2019

(87) PCT Pub. No.: WO2018/050863
PCT Pub. Date: Mar. 22, 2018

(65) Prior Publication Data
US 2019/0200641 A1    Jul. 4, 2019

(30) Foreign Application Priority Data
Sep. 16, 2016 (GB) ...................................... 1615795

(51) Int. Cl.
| | | |
|---|---|---|
| A23J 1/00 | (2006.01) | |
| A23K 10/38 | (2016.01) | |
| A23J 3/14 | (2006.01) | |
| A23L 7/20 | (2016.01) | |
| A23L 33/185 | (2016.01) | |
| A23P 30/10 | (2016.01) | |
| A23L 7/10 | (2016.01) | |
| A23K 50/40 | (2016.01) | |
| A23J 1/12 | (2006.01) | |

(52) U.S. Cl.
CPC .................. *A23J 1/005* (2013.01); *A23J 1/12* (2013.01); *A23J 3/14* (2013.01); *A23K 10/38* (2016.05); *A23K 50/40* (2016.05); *A23L 7/197* (2016.08); *A23L 7/20* (2016.08); *A23L 33/185* (2016.08); *A23P 30/10* (2016.08); *A23V 2002/00* (2013.01); *A23V 2250/542* (2013.01); *A23V 2250/5488* (2013.01); *A23V 2300/10* (2013.01); *A23V 2300/31* (2013.01)

(58) Field of Classification Search
CPC .... A23J 1/00; A23J 3/14; A23K 10/38; A23L 7/10; A23L 7/20; A23L 33/185; A23P 30/10
See application file for complete search history.

(56) References Cited

U.S. PATENT DOCUMENTS

| | | | |
|---|---|---|---|
| 4,341,805 A | 7/1982 | Chaudhary et al. | |
| 4,377,601 A | 3/1983 | Dreese et al. | |
| 4,547,382 A * | 10/1985 | Gannon | A21D 2/36 426/482 |
| 4,938,986 A * | 7/1990 | Zurcher | A21D 2/368 426/624 |
| 5,135,765 A | 8/1992 | Kobayashi et al. | |
| 5,156,877 A | 10/1992 | Kishi et al. | |
| 7,670,633 B2 | 3/2010 | Srinivasan et al. | |
| 2009/0175993 A1 | 7/2009 | Erasmus | |
| 2012/0128779 A1* | 5/2012 | Taylor | A23L 33/12 424/491 |
| 2016/0194679 A1 | 7/2016 | Mackay et al. | |

FOREIGN PATENT DOCUMENTS

| | | |
|---|---|---|
| DE | 1767670 A1 | 9/1971 |
| DE | 4243879 C1 | 3/1994 |
| EP | 0050330 * | 4/1982 |
| GB | 1363578 | 8/1974 |

OTHER PUBLICATIONS

English translation for EP0050330 published Apr. 1982.*
Weaver. 2015. Have a Cow . . . and We Mean a Pet Cow. https://www.hobbyfarms.com/have-a-cow-3/.*
Kissell, "Protein and Fibre Enrichment of Cookie Flour with Brewer's Spent Grain", Cereal Chem., 56(4):261-266, Nov. 7, 1979.
Mussato, "Brewers' Spent Grain: A Valuable Feedstock for Industrial Applications: Brewers' Spent Grain and its Potential Applications", Journal of Science of Food and Agriculture, vol. 94, No. 7, Jan. 24, 2014, pp. 1264-1275.
Mussatto, et al., "Brewers' Spent Grain: Generation, Characteristics and Potential Applicaitons", Journal of Cereal Science, Academic Press, Ltd. GB, vol. 43, No. 1, Jan. 1, 2006, pp. 1-14.
Santos, et al., "Brewers' Spent Grain Flour and its Incorporation in Biscuits", Alimentaria, CSIC, ES, No. 393, Jan. 1, 2008, pp. 95-101.

* cited by examiner

Primary Examiner — Anthony J Weier
(74) Attorney, Agent, or Firm — Baker Botts L.L.P.

(57) ABSTRACT

The present disclosure relates to food compositions, particularly pet food compositions, having a high content of plant protein. The plant protein is prepared by processing Brewer's Spent Grain (BSG), having a moisture content of about 15% to about 35% by weight, so as to reduce the particle size of the BSG and separating the processed BSG so as to provide a low particle size, high protein fraction.

19 Claims, No Drawings

FOOD COMPOSITION HAVING A HIGH PLANT PROTEIN CONTENT AND METHODS FOR MAKING THE SAME

CROSS-REFERENCE TO RELATED APPLICATION

This application is a national phase application under 35 U.S.C. § 371 of International Application No. PCT/EP2017/073358, filed Sep. 15, 2017, which claims the benefit of Great Britain Application No. 1615795.0, filed Sep. 16, 2016, all of which applications are incorporated herein by reference in their entireties.

FIELD

This disclosure relates generally to a food composition, particularly a pet food composition, having a high plant protein content and to methods for making the food composition. The plant protein is derived from Brewer's Spent Grain.

BACKGROUND

World population growth is well-known to exert corresponding pressure on the food supply. As population increases, already costly food ingredients, such as food protein, may become prohibitively expensive for consumption by companion animals. Thus, there is a need for alternative protein sources that do not compete with the human food chain. Such alternative protein sources include by-products from processing of crops for human consumption and from industrial processing. While these by-products are relatively abundant and often contain high levels of digestible plant protein, they also tend to be high in lignin, cellulosic and non-cellulosic polysaccharides. The high fibre content of these by-products often restricts their applicability to use as animal feed for non-ruminants.

Brewers' Spent Grain (BSG) is a by-product from the brewing industry, and it generally has a protein content of about 20% to 25% on a dry matter basis and a high lysine content. While BSG contains moderate levels of protein, the high crude fibre content restricts its use as an animal feed for pets and companion animals.

Attempts have been made to increase the protein content of BSG.

US 2009175993 is directed to a process wherein barley BSG with a moisture content between 70% and 75% was treated using a one step wet brushing technique, in this process a plant material in a wet condition is brushed or combed against a separation medium, fibrous material is retained on the separation medium while proteinaceous material is forced through the medium. The typical sieve aperture will vary between 0.3 and 3 mm, with an optimum sieve size of 1 mm. The high protein stream may have a protein content of at least 40% by mass on a dry basis.

U.S. Pat. No. 5,156,877 discloses a protein rich composition derived from Brewer's Spent Grain and which contains 40 to 60% of proteins. The composition is produced by pressing the Brewer's Spent Grain in a wet state, typically with a water content of 65% by weight or greater, and then separating the pressed material based on particle size. The fraction of particles having a particle size less than about 500 micron had a protein content of about 50%. However, the yield of the high protein fraction was low, based on the weight of the starting Brewer's Spent Grain.

U.S. Pat. No. 4,377,601 is directed to a process of producing a bran from BSG, the process comprising drying a spent grain to a moisture content less than about 15%, preferably about 9%, prior to milling. The dried BSG is ground in a roller mill and sieved through a sieve having openings of about 500 micron. The sieve retains the hull particles and the ground product which passes through the screen is collected. The recovered bran product has a high dietary fibre content and a protein content of about 33%.

U.S. Pat. No. 7,670,633 discloses a method that combines gravity air elutriation and dry sieving operations to fractionate Distillers Dried Grain (DDG) or Distillers Dried Grain with Solubles (DDGS) in order to decrease fibre content and increase protein content of the material.

It would be desirable to provide a food composition high in plant protein content. It would also be desirable to provide a food composition, particularly a pet food composition, low in crude fibre. It would further be desirable to provide a plant protein ingredient derived from readily available Brewer's Spent Grain.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates.

SUMMARY

In one aspect there is provided a food composition, wherein said food composition comprises a plant protein ingredient, wherein said plant protein ingredient is derived from Brewer's Spent Grain, and wherein said plant protein ingredient has a particle size of less than 105 microns and a protein content of at least about 30% by weight based on the dry weight of the plant protein ingredient.

In another aspect there is provided a method of making a food composition comprising the step of combining a plant protein ingredient with one or more other ingredients, wherein said plant protein ingredient is derived from Brewer's Spent Grain, and wherein said plant protein ingredient has a particle size of less than 105 microns and a protein content of at least about 30% by weight based on the dry weight of the plant protein ingredient.

The food composition may comprise between about 5% and about 70% by weight of the plant protein ingredient, or between about 5% and about 50% by weight of the plant protein ingredient, based on the dry weight of the food composition.

The plant protein ingredient may have a protein content of at least about 35% by weight, or at least about 40% by weight, or at least about 45% by weight, or at least about 50% by weight, or at least about 55% by weight, or at least about 60% by weight based on the dry weight of the plant protein ingredient.

The plant protein ingredient may have a crude fibre content of less than about 10% by weight, or less than about 8% by weight, or less than about 6% by weight based on the dry weight of the plant protein ingredient.

The plant protein ingredient may have a moisture content of from about 5% to about 30% by weight or from about 5% to about 20% by weight based on the weight of the plant protein ingredient and moisture.

The food composition may be a pet food composition.

The high protein content of the plant protein ingredient enables greater flexibility in the formulation of food compositions, particularly pet food compositions. Advantageously, food compositions, particularly pet food compositions, may be prepared with a lower proportion of animal protein and a higher proportion of plant protein.

The low fibre content of the plant protein ingredient is also advantageous in formulating food compositions where control of fibre content is important.

In another aspect there is provided a plant protein ingredient derived from Brewer's Spent Grain, wherein said plant protein ingredient has a particle size of less than 105 microns and a protein content of at least about 30% by weight.

The plant protein ingredient may have a protein content of at least about 35% by weight, or at least about 40% by weight, or at least about 45% by weight, or at least about 50% by weight, or at least about 55% by weight, or at least about 60% by weight based on the dry weight of the plant protein ingredient.

The plant protein ingredient may have a crude fibre content of less than about 10% by weight, or less than about 8% by weight, or less than about 6% by weight based on the dry weight of the plant protein ingredient.

The plant protein ingredient may have a moisture content of from about 5% to about 30% by weight, or from about 5% to about 20% by weight based on the weight of the plant protein ingredient and moisture.

In another aspect there is provided a method of making a plant protein ingredient comprising the following steps:
(a) processing Brewer's Spent Grain so as to reduce the particle size, and
(b) separating the processed Brewer's Spent Grain into fractions, wherein the plant protein ingredient comprises at least one of the fractions with a particle size of less than 105 microns and wherein the less than 105 micron particle size fraction has a protein content of at least about 30% by weight based on the dry weight of the plant protein ingredient;
wherein the moisture content of the Brewer's Spent Grain is adjusted to between about 10 to about 35% by weight either before, during or after step (a).

Advantageously, adjustment of the water content of the Brewer's Spent Grain to between about 10 to about 35% by weight improves the yield of the fraction having a particle size of less than 105 microns.

Accordingly, the methods disclosed herein provide a route to a high yield of high plant protein content ingredient derived from Brewer's Spent Grain.

In another aspect there is provided a method of making a plant protein ingredient comprising the following steps:
(a) adjusting the moisture content of a Brewer's Spent Grain to between about 10 to about 35% by weight,
(b) processing the adjusted Brewer's Spent Grain so as to reduce the particle size, and
(c) separating the processed Brewer's Spent Grain into fractions, wherein the plant protein ingredient comprises at least one of the fractions with a particle size of less than 105 microns and wherein the less than 105 micron particle size fraction has a protein content of at least about 30% by weight based on the dry weight of the plant protein ingredient.

The plant protein ingredient may have a protein content of at least about 35% by weight, or at least about 40% by weight, or at least about 45% by weight, or at least about 50% by weight, or at least about 55% by weight, or at least about 60% by weight based on the dry weight of the plant protein ingredient.

The less than 105 micron particle size fraction may have a crude fibre content of less than about 10% by weight, or less than about 8% by weight, or less than about 6% by weight based on the dry weight of the plant protein ingredient.

In another aspect there is provided a method of making a plant protein ingredient comprising the following steps:
(a) providing a Brewer's Spent Grain with a moisture content of less than about 10% by weight,
(b) hydrating the Brewer's Spent Grain to a moisture content of between about 10 and about 35% by weight,
(c) processing the hydrated Brewer's Spent Grain so as to reduce the particle size, and
(d) separating the processed Brewer's Spent Grain into fractions, wherein the plant protein ingredient comprises at least one of the fractions with a particle size of less than 105 microns and wherein the less than 105 micron particle size fraction has a protein content of at least about 30% by weight based on the dry weight of the plant protein ingredient.

The plant protein ingredient may have a protein content of at least about 35% by weight, or at least about 40% by weight, or at least about 45% by weight, or at least about 50% by weight, or at least about 55% by weight, or at least about 60% by weight based on the dry weight of the plant protein ingredient.

The less than 105 micron particle size fraction may have a crude fibre content of less than about 10% by weight or less than about 8% by weight, or less than about 6% by weight based on the dry weight of the plant protein ingredient.

Advantageously, it has been found that processing Brewer's Spent Grain having a moisture content of between about 10 and about 35% by weight so as to reduce particle size facilitates the formation of smaller particles and may also facilitate separation of the smaller particles from larger particles. The smaller particles have a higher protein content relative to the protein content of the initial Brewer's Spent Grain.

Accordingly, in any of the hereinabove disclosed methods the yield of fractions with a particle size of less than 105 microns may be about 10 to about 80% by weight, or about 10 to about 70% by weight, or about 10 to about 60% by weight, or about 25 to about 80% by weight or about 25 to about 70% by weight based on the weight of the Brewer's Spent Grain.

The yield of fractions with a particle size of less than 105 microns may be greater than 10%, or greater than 20%, or greater than 25%, or greater than 30%, or greater than 40%, or greater than 50% by weight based on the weight of the Brewer's Spent Grain.

In any of the hereinbefore disclosed methods the processing and separating steps may be repeated. That is to say that the larger particle size fractions may be re-processed and the resulting re-processed material subjected to separation so as to yield further material having a particle size less than 105 micron. The above disclosed yields may be achieved through single or multiple processing steps as disclosed herein.

Any of the hereinbefore disclosed methods may further comprise drying the at least one separated fraction having a particle size of less than 105 microns to a moisture content of from about 5% to about 20% by weight of the separated fraction.

The adjusting of the moisture content of the Brewer's Spent Grain may be achieved through drying or hydrating.

In any of the hereinabove disclosed methods the processing may comprise grinding or milling. In a preferred embodiment the processing may comprise pin milling.

In another aspect there is provided a plant protein ingredient produced by any one of the hereinbefore disclosed methods.

In another aspect there is provided a food composition prepared from a plant protein ingredient made by any one of the hereinbefore disclosed methods.

In the following, a detailed description of the food composition and plant protein ingredient is provided as well as methods of their preparation.

Throughout this specification, use of the terms "comprises" or "comprising" or grammatical variations thereon shall be taken to specify the presence of stated features, integers, steps or components but does not preclude the presence or addition of one or more other features, integers, steps, components or groups thereof not specifically mentioned.

DESCRIPTION

Before the present compositions or methods are disclosed and described, it is to be understood that unless otherwise indicated this disclosure is not limited to specific compositions and methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms 'a', 'an' and 'the' include plural referents unless otherwise specified. Thus, for example, reference to 'a fraction' may include more than one fractions, and the like.

The term "about" when used before a numerical value indicates that the value may vary within a reasonable range, such as plus or minus 5%, plus or minus 1%, plus or minus 0.2%.

All percentages and ratios are calculated by weight unless otherwise indicated. All percentages and ratios are calculated based on the total composition unless otherwise indicated.

Every numerical range given throughout this specification will include every narrower numerical range that falls within such broader numerical range, as if such narrower numerical ranges were all expressly written herein.

The methods and compositions disclosed herein may comprise, consist essentially of, or consist of any of the features or embodiments as described herein.

In the description of the various embodiments of the disclosure, various embodiments or individual features are disclosed. As will be apparent to the ordinarily skilled practitioner, all combinations of such embodiments and features are possible and can result in preferred executions of the disclosure. While various embodiments and individual features of the invention have been illustrated and described, various other changes and modifications can be made without departing from the spirit and scope of the invention. As will also be apparent, all combinations of the embodiments and features taught in the present disclosure are possible and can result in preferred executions of the invention.

The plant protein ingredient described and produced herein can be used as an ingredient in food for any animal including humans, animals or pets, where a pet is a domestic animal including, but not limited to domestic dogs (canines), cats (felines), horses, ferrets, rabbits, rats, mice, gerbils, hamsters, fish, birds, and the like. Domestic dogs and domestic cats are particular examples of pets and are referred to herein as companion animals. One preferred use of the plant protein ingredient is in a food composition, particularly a pet food composition.

The present disclosure provides a food composition comprising a plant protein ingredient derived from BSG comprising particles having a particle size less than about 105 μm and a protein content of at least about 30% by weight based on the dry weight of the plant protein ingredient. In another embodiment, the food composition comprises a plant protein ingredient derived from BSG comprising particles having a particle size less than about 105 μm and having a protein content from about 30% to about 70% by weight based on the dry weight of the plant protein ingredient. In other embodiments, the food composition comprises a plant protein ingredient derived from BSG comprising particles having a particle size less than about 105 μm and having a protein content from about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69% to about 70% by weight based on the dry weight of the plant protein ingredient, including all ranges therebetween. Preferably, the food composition comprises a plant protein ingredient derived from BSG comprising particles having a particle size less than about 105 μm and having a protein content of at least about 45% by weight based on the dry weight of the plant protein ingredient The present disclosure provides a food composition comprising a plant protein ingredient derived from BSG comprising particles having a particle size less than about 105 μm and a crude fibre content of less than about 10% by weight based on the dry weight of the plant protein ingredient. In other embodiments, the food composition comprises a plant protein ingredient derived from BSG comprising particles having a particle size less than about 105 μm and having a crude fibre content less than about 10%, 9%, 8%, 7%, 6%, 5% or less than about 4% by weight based on the dry weight of the plant protein ingredient, including all ranges therebetween. Preferably, the food composition comprises a plant protein ingredient derived from BSG comprising particles having a particle size less than about 105 μm and having a crude fibre content of less than about 6% by weight based on the dry weight of the plant protein ingredient.

The present disclosure provides a food composition comprising a plant protein ingredient derived from BSG comprising particles having a particle size less than about 105 μm and a protein content of at least about 30% by weight based on the dry weight of the plant protein ingredient and a crude fibre content of less than about 10% by weigh based on the dry weight of the plant protein ingredient t. In an embodiment, the food composition comprises a plant protein ingredient derived from BSG comprising particles having a particle size less than about 105 μm and having a protein content from about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69% to about 70% by weight based on the dry weight of the plant protein ingredient, including all ranges therebetween and a crude fibre content less than about 10%, 9%, 8%, 7%, 6%, 5% or less than about 4% by weight based on the dry weight of the plant protein ingredient, including all ranges therebetween. Preferably, the food composition comprises a plant protein ingredient derived from BSG comprising particles having a particle size less than about 105 μm and having a protein content of at least about 45% by weight based on the dry weight of the plant protein ingredient and a crude fibre content of less than about 6% by weight. based on the dry weight of the plant protein ingredient.

The plant protein ingredient may be included from about 5% to about 70% by weight, or from about 5% to about 50% by weight of a food composition based on the dry weight of the food composition. In an embodiment, the plant protein ingredient may be included from about 10% to about 20% by weight of a food composition based on the dry weight of the food composition. In certain embodiments, the plant protein ingredient may comprise from about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, or 44% to about 45% of the food composition based on the dry weight of the food composition, including all ranges therebetween.

The terms "pet food" or "pet food composition" are intended to mean a composition suitable for ingestion by an animal and preferably a pet. Pet foods can include, without limitation, nutritionally balanced compositions suitable for daily feed, as well as supplements and/or treats, which may or may not be nutritionally balanced. The term "nutritionally balanced" means that a composition, such as pet food has known required nutrients to sustain life in proper amounts and proportions based on recommendations of recognized authorities, including governmental agencies, such as, but not limited to, United States Food and Drug Administration's Centre for Veterinarian Medicine, the American Feed Control Officials Incorporated, in the field of pet nutrition, except for the additional need for water. The pet food composition herein may be a dry composition (for example, kibble), semi-moist composition, wet composition, or any mixture thereof. Alternatively or additionally, the composition is a supplement, such as a gravy, drinking water, yogurt, powder, suspension, chew, treat (e.g., biscuits) or any other delivery form. Moreover, in one embodiment the composition can be nutritionally balanced, such as a pet food kibble. In another embodiment, the composition is not nutritionally balanced, such as a supplement, treat, or other delivery form for a pet.

Non-limiting examples of dry compositions may optionally contain on a dry matter basis, from about 1% to about 50% crude protein, from about 0.5% to about 25% crude fat, from about 1% to about 10% supplemental fibre, all by weight of the composition. The dry composition may have a total moisture content from about 1% to about 30% moisture. Alternatively, a dry composition may contain on a dry matter basis, from about 5% to about 35% crude protein, from about 5% to about 25% crude fat, from about 2% to about 8% supplemental fibre, all by weight of the composition. The dry composition may have a total moisture content from about 2% to about 20% moisture. Alternatively, the dry composition contains on a dry matter basis, a minimum protein level of about from about 9.5% to about 35%, a minimum fat level of from about 8% to about 20%, a minimum supplemental fibre level of from about 3% to about 7%, all by weight of the composition. The dry animal composition may also have a minimum metabolizable energy level of about 3.5 kcal/g. The dry composition may have a total moisture content from about 3% to about 10%.

Non-limiting examples of a semi-moist composition may optionally contain on a dry matter basis, from about 0.5% to about 50% crude protein, from about 0.5% to about 25% crude fat, from about 0.5% to about 15% supplemental fibre, all by weight of the composition. The semi-moist composition may have a total moisture content from about 30% to about 50% moisture. Alternatively, the semi-moist compositions may contain on a dry matter basis, from about 5% to about 35% crude protein, from about 5% to about 25% crude fat, from about 1% to about 5% supplemental fibre, and all by weight of the composition. The semi-moist composition may have a total moisture content from about 35% to about 45% moisture.

Alternatively, the semi-moist composition may have on a dry matter basis, a minimum protein level of about from about 9.5% to about 22%, a minimum fat level of from about 8% to about 13%, a minimum supplemental fibre level of from about 2% to about 3%, all by weight of the composition. The semi-moist composition may have a total moisture content from about 38% to about 42%. The semi-moist composition may also have a minimum metabolizable energy level of about 3.5 kcal/g and from about 0.1% to about 20% ash, and from about 0.001% to about 5.0% taurine.

Non-limiting examples of a moist composition may optionally contain on a dry matter basis, from about 0.5% to about 50% crude protein, from about 0.5% to about 25% crude fat, from about 0.01% to about 15% supplemental fibre, all by weight of the composition. The moist composition may have a total moisture content from about 50% to about 90% moisture.

Alternatively, the moist compositions may contain on a dry matter basis, from about 5% to about 35% crude protein, from about 5% to about 25% crude fat, from about 0.05% to about 5% supplemental fibre, all by weight of the composition. The moist composition may have a total moisture content from about 60% to about 85% moisture. Alternatively, a moist animal composition may contain on a dry matter basis, a minimum protein level of about from about 9.5% to about 22%, a minimum fat level of from about 8% to about 13%, a minimum supplemental fibre level of from about 0.1% to about 3%, all by weight of the composition. The moist composition may have a total moisture content from about 65% to about 80%. The moist composition may also have a minimum metabolizable energy level of about 1.0 kcal/g and from about 0.1% to about 20% ash, and from about 0.001% to about 5.0% taurine.

In an embodiment, the food composition, whether dry, moist, semi-moist or otherwise, comprises on a dry matter basis, from about 5% to about 50%, alternatively 20% to about 50% of animal-derived ingredients, by weight of the composition. Non-limiting examples of animal-derived ingredients include chicken, beef, pork, lamb, turkey (or other animal) protein or fat, egg, fishmeal, and the like.

Where the composition is in the form of a supplement or "treat," such as biscuits, chews, and other treats, the supplement may comprise, on a dry matter basis, from about 20% to about 60% protein, from about 22% to about 40% protein, by weight of the supplement composition. As another non-limiting example, the compositions may comprise a supplement comprising a dry matter basis, from about 5% to about 35% fat, or from about 10% to about 30% fat, by weight of the supplement composition, along with optimal vitamins and minerals. Compositions, treats and supplement compositions intended for use by animals such as cats or dogs are commonly known in the art.

The compositions can further comprise a wide range of other optional ingredients. It is to be understood that they can include vegetables, fruit, egg-based materials, undenatured proteins, food grade polymeric adhesives, gels, polyols, starches, gums, seasonings, salts, colorants, time-release compounds, minerals, vitamins, antioxidants, aroma modifiers, textured wheat protein, textured soy protein, textured lupin protein, textured vegetable protein, breading, flour, comminuted pasta, and combinations thereof.

The food composition may be prepared by combining the plant protein ingredient as herein disclosed with one or more other ingredients.

The food composition may comprise between about 5% and about 70% by weight of the plant protein ingredient, or between about 5% and about 50% by weight of the plant protein ingredient, based on the dry weight of the food composition.

Brewer's Spent Grain (BSG) is the non-fermentable by-product of the cereal malting process where the cereal is selected from barley, wheat, rye, oats, rice or combinations thereof. BSG may include "Brewers' Dried Grain" and can be interpreted as understood in the art and is intended to encompass definitions such as the feed ingredient definition according to the Association of American Feed Control Officials, including the "dried extracted residue of barley malt alone or in mixture with other cereal grain or grain products resulting from the manufacture of wort or beer and may contain pulverized dried spent hops in an amount not to exceed 3% evenly distributed." (IFN 5-00-516 Barley brewers grain dehydrated). BSG may include "Brewers' Wet Grain" and can be interpreted as understood in the art and is intended to encompass definitions such as the feed ingredient definition according to the Association of American Feed Control Officials, including the "extracted residue resulting from the manufacture of wort from barley malt alone or in mixture with other cereal grain or grain products" (IFN 5-00-517 Barley brewers grain wet).

The present disclosure provides a plant protein ingredient derived from BSG comprising particles having a particle size less than about 105 µm and a protein content of at least about 30% by weight based on the dry weight of the plant protein ingredient. In another embodiment, the plant protein ingredient has a protein content from about 30% to about 70% by weight based on the weight of the plant protein ingredient. In other embodiments, the plant protein ingredient derived from BSG can have a protein content from about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69% to about 70% by weight based on the dry weight of the plant protein ingredient, including all ranges therebetween. Preferably, the plant protein ingredient has a protein content of at least about 45% by weight based on the dry weight of the plant protein ingredient.

The present disclosure provides a plant protein ingredient derived from BSG comprising particles having a particle size less than about 105 µm and a crude fibre content of less than about 10% by weight based on the dry weight of the plant protein ingredient. In other embodiments, the plant protein ingredient may have a crude fibre content less than about 10%, 9%, 8%, 7%, 6%, 5% or less than about 4% by weight based on the dry weight of the plant protein ingredient, including all ranges therebetween. Preferably, the plant protein ingredient has a crude fibre content of less than about 6% by weight based on the dry weight of the plant protein ingredient.

The present disclosure provides a plant protein ingredient derived from BSG comprising particles having a particle size less than about 105 µm and a protein content of at least about 30% by weight based on the dry weight of the plant protein ingredient and a crude fibre content of less than about 10% by weight based on the dry weight of the plant protein ingredient. In an embodiment, the plant protein ingredient has a protein content from about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69% to about 70% by weight, based on the dry weight of the plant protein ingredient, including all ranges therebetween and a crude fibre content less than about 10%, 9%, 8%, 7%, 6%, 5% or less than about 4% by weight, based on the dry weight of the plant protein ingredient, including all ranges therebetween. Preferably, the plant protein ingredient has a protein content of at least about 45% by weight based on the dry weight of the plant protein ingredient and a crude fibre content of less than about 6% by weight based on the dry weight of the plant protein ingredient.

The moisture content of the BSG may be decreased or increased to produce a BSG having from about 10% to about 35% moisture by weight based on the total weight of the BSG and moisture. In certain embodiments, the BSG may have from about 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, or 34% to about 35% moisture content by weight based on the total weight of the BSG and moisture. Preferably the BSG has from about 10% to about 25% by weight based on the total weight of BSG and moisture.

The moisture content of the BSG can be decreased to produce a BSG having from about 10% to about 35% moisture by drying or dewatering operations where drying is a means to remove water from a material by evaporation and where dewatering is a means to remove water from a material by means other than evaporation, where any evaporation which occurs during the dewatering process is only incidental to handling and processing of the material. Suitable drying apparatus may be selected from a rotary drum dryer, a spray dryer, a flash dryer, a ring dryer, a freeze dryer, a vacuum dryer, a rotary gas-fired dryer, a rotary steam-tube dryer and any combination thereof. Suitable dewatering apparatus are selected from filters, presses, screw presses, belt presses, centrifuges and any combinations thereof.

Alternatively the moisture content of the BSG may be increased to produce a BSG having from about 10% to about 35% moisture by adding an aqueous component such as a source of potable water, water obtained from a brewing process, Brewers' Condensed Solubles, lauter tun drainings, press liquor, rinse effluent, tank rinses, or waste beer.

The BSG may be processed so as to reduce the particle size and provide the plant protein ingredient as disclosed herein. Typical processes include comminuting, grinding and/or milling to generate a material with certain size parameters, e.g. a uniform size or a material with an average particle size or threshold particle size. In one embodiment, reference to particle size in the specification means average particle size. In a particular embodiment, one or more size parameters are selected as a means for facilitating separation. For example, a process to reduce the size of the particles can be selected from grinding, milling, chopping, cutting, dicing, shredding, emulsifying, homogenizing, high pressure homogenizing and/or any combination thereof. In an embodiment, the process may be selected from grinding and/or milling. In an embodiment, the apparatus that is used to reduce the size of the particles may be selected from an impact mill, a pin mill, a roller mill, and a hammer mill.

The BSG may be processed until from about 10 to about 70% of the particles by weight of the BSG have a size of 105

μm or less, or 10 to 60% or 10 to 50%, or 10 to 40%. In certain embodiments, the processed BSG may comprise from about 10%, 11%, 12%, 13%, 14%, 15%, 16%, 17%, 18%, or 19% to about 20% of particles by weight of the BSG having a size of 105 μm or less.

The size-reduced BSG may be separated by particle size so as to provide two or more fractions of different particle size, where the term fraction is intended to mean a separated or differentiated portion of a starting substance. The term is intended to encompass a yet further differentiated portion of a fraction or sub-fraction. The particles are separated based on the difference in the size of particles of a material. In a particular embodiment, the process may use a mechanical sieve or screen. For example, a sieve may be in the form of a regular or irregular mesh, a perforated solid surface, a three-dimensional matrix, or a column of differential porosity. The term encompasses a process separating a larger particle from a smaller particle. Separation may be achieved with the assistance of equipment using vibratory motion. As used herein, the term "particle size" refers to particle diameter as measured using a physical sieve analysis method.

The methods disclosed herein may further comprise the steps of processing the fractions having a particle size greater than 105 μm so as to reduce the particle size and then separating the processed BSG so as to provide two or more fractions of different particle size. The fractions having a particle size less than 105 μm can be optionally combined and may provide a plant protein ingredient.

The moisture content of the fraction having a particle size greater than 105 μm can be increased to about 5% to about 35% by weight, preferably from about 5% to about 20% by weight, based on the total weight of the fraction and moisture, before processing the fraction so as to reduce the particle size.

The disclosure may be further understood by the following non-limiting examples.

EXAMPLES

General Methods

Moisture content is determined by method AOAC 925.10 (Official Methods of Analysis of AOAC International 19th Edition AOAC, Gaithersburg, Md.). Crude fibre is determined by AOAC Method 978.10 (Official Methods of Analysis of AOAC International 17th Edition AOAC, Gaithersburg, Md.). Protein is determined by the method of Dumas Procedure AOAC 992.23 or Kjeldahl Procedure 981.10 (Official Methods of Analysis of AOAC International 17th Edition AOAC, Gaithersburg, Md.).

The yield (%) was calculated as the weight of the fraction comprising particles having a particle size less than about 105 μm or less than about 106 μm (depending on the screen size used) as a percentage of the weight of the starting material before sieving.

Roller mill apparatus: Vario Roll driving fluted rolls at 8.2 f/cm; left roll at 200 rpm and right roll at 1200 rpm; roll gap of zero.

Pin mill apparatus: Alpine pin disc rotor mill, chamber diameter of 320 mm with a rotor diameter of 160 mm. Four concentric rings of round pins, each 10 mm long×3 mm diameter. Stator has a similar arrangement of four concentric rings of pins but slightly offset to those on the rotor.

Hammer mill apparatus: Perten 3100 Falling Number hammer mill with a 1.0 mm screen.

Example 1

Wet BSG was sourced from a brewery and dried using a fluidized bed dryer to a moisture content of about 5%. The protein and crude fibre content of the BSG after drying is shown in Table 1 below.

TABLE 1

| Composition of BSG on a dry matter basis | |
|---|---|
| Protein (%, dry matter basis) | 24.7% |
| Crude Fibre (%, dry matter basis) | 19.8% |

A portion of the dried BSG was adjusted to a moisture content of 16% by addition of potable water. The BSG samples were milled using either a Vario roller mill, an Alpine pin disc rotor mill or a Perten hammer-type mill. The milled BSG samples were then separately sieved using a rotary-type Simon sifter with Endecotts screens at 200 rpm for 5 minutes through a 500 μm screen, a 250 μm screen and a 106 μm screen. The first fraction, having a particle size greater than 106 μm, and the second fraction, having a particle size of less than 106 μm, were collected.

The yield and protein content (dry matter basis) of the processed samples is shown in Table 2 below.

TABLE 2

Yield and Protein Content (dry matter basis) for BSG milled using different apparatus where the moisture content is held constant and where the fraction collected has a particle size less than 106 μm.

| Milling technology | BSG, 5% moisture content | | BSG, 16% moisture content | |
|---|---|---|---|---|
| | Protein content (% dry matter basis) | Yield (%) | Protein content (% dry matter basis) | Yield (%) |
| Roller mill | 38.4 | 13.0 | 42.8 | 10.0 |
| Pin Mill | 35.6 | 45.0 | 47.9 | 19.0 |
| Hammer Mill | 35.0 | 28.0 | — | — |

The results demonstrate that milling the BSG increases the protein content of the fractions generated after sieving and that the choice of milling apparatus influences the yield of the recovered fractions. The high yield and protein content of the fraction having a particle size less than 106 μm fraction after pin milling and sieving demonstrates that pin milling is better than roller milling and hammer milling when size reducing BSG and sieving.

Example 2

Wet BSG was sourced from a brewery and dried using a fluidized bed dryer to a moisture content of about 7% to produce a dried BSG. The protein and fibre content of the BSG after drying was the same as that shown in Table 1 above.

A portion of the dried BSG was adjusted to moisture contents of 10%, 15%, 20%, 25%, 30%, or 35% by the addition of potable water. The BSG samples were then milled using an Alpine pin disc rotor mill. The milled BSG samples were sieved using a Le Coq sifter with a 105 μm stainless steel screen at a feed rate of 20 kg/hr and exhausted through a cyclone. The first fraction, having a particle size greater than 105 μm, and the second fraction, having a particle size of less than 105 μm, were collected.

The yield and protein content (dry matter basis) of the processed samples is shown in Table 3 below.

TABLE 3

Yield and % Protein Content (dry matter basis) for BSG milled using a Pin Mill and where the moisture content of the BSG is variable and where the fraction collected has a particle size less than 105 μm

| Moisture content of BSG (%) | Protein content (% dry matter basis) | Yield (%) |
| --- | --- | --- |
| 7% | 33.0 | 50.2 |
| 10% | 36.9 | 38.6 |
| 15% | 41.7 | 22.2 |
| 20% | 47.1 | 13.6 |
| 25% | 47.2 | 10.9 |
| 30% | 50.2 | 6.9 |
| 35% | 37.5 | 4.7 |

The results demonstrate that the moisture content of BSG during pin milling influences the protein content of the fraction with a particle size less than 105 μm with protein content increasing as moisture content increases up to 30%. At a moisture content of 35%, the protein content also decreases. The results also demonstrate that the yield of the fraction with a particle size less than 105 μm is influenced by the moisture content of the BSG during pin milling, with yield decreasing as moisture content increases.

Example 3

Wet BSG was sourced from a brewery and dried using a fluidized bed dryer to a moisture content of about 7% to produce a dried BSG. The protein and fibre content of the BSG after drying was the same as that shown in Table 1.

A portion of the dried BSG was adjusted to a moisture content of 10%, 15%, 20%, 25%, 30%, or 35% by the addition of potable water. The BSG samples were then milled using an Alpine pin disc rotor mill. The milled BSG samples were sieved using a Le Coq sifter with a 105 μm stainless steel screen at a feed rate of 20 kg/hr and exhausted through a cyclone. The fraction having a particle size greater than 105 μm (first fraction) and the fraction having a particle size of less than 105 μm (second fraction) were collected.

The first fraction, having a particle size greater than 105 μm, was then re-milled using an Alpine pin disc rotor mill. The size-reduced first fraction was sieved using a Le Coq sifter with a 105 μm stainless steel screen at a feed rate of 20 kg/hr and exhausted through a cyclone. The fractions having a particle size less than 105 μm (second sub-fraction) were collected and combined with the second fraction from the first milling/sieving operation to provide a "two pass milling" sample.

The yield and protein content (dry matter basis) of the processed samples is shown in Table 4 below. For the "two pass milling" sample, the yield was calculated as the combined weight of the fractions comprising particles having a particle size less than 105 μm (second fraction and second sub-fraction) as a percentage of the weight of the starting material.

TABLE 4

Yield and % Protein Content (dry matter basis) for BSG milled using a Pin Mill either as a single pass or two pass milling operation and where the moisture content is variable and where the fractions collected have a particle size less than 105 μm

| | Single pass milling | | Two pass milling | |
| --- | --- | --- | --- | --- |
| Moisture content of BSG (%) pre-milling | Protein content (% dry matter basis) | Yield (%) | Protein content (% dry matter basis) | Yield (%) |
| 7% | 33.0 | 50.2 | 31.7 | 71.7 |
| 10% | 36.9 | 38.6 | 32.5 | 62.0 |
| 15% | 41.7 | 22.2 | 35.4 | 43.4 |
| 20% | 47.1 | 13.6 | 41.8 | 26.9 |
| 25% | 47.2 | 10.9 | 43.9 | 20.9 |
| 30% | 50.2 | 6.9 | 40.7 | 18.5 |
| 35% | 37.5 | 4.7 | 35.9 | 8.5 |

The results demonstrate that a two pass milling operation increases the yield of the fraction comprising particles having a particle size less than 105 μm, though a decrease in protein content of the combined materials is also observed.

Example 4

Wet BSG was sourced from a brewery and dried using a fluidized bed dryer to a moisture content of about 7% to produce a dried BSG. The protein and crude fibre content of the BSG after drying is shown in Table 5 below.

A portion of the dried BSG was adjusted to a moisture content of 20% by the addition of potable water. The BSG sample was then milled using an Alpine pin disc rotor mill. The milled BSG was sieved using a Le Coq sifter with a 105 μm stainless steel screen at a feed rate of 20 kg/hr and exhausted through a cyclone. The fraction having a particle size less than 105 μm was collected (processed BSG).

The protein and crude fibre content of the processed BSG is shown in Table 5 below.

TABLE 5

Composition of dried BSG (before processing) and processed BSG on a dry matter basis

| | BSG, before processing | Processed BSG |
| --- | --- | --- |
| Protein (%, dry matter basis) | 22.9 | 50.1 |
| Crude Fibre (%, dry matter basis) | 18.4 | 3.8 |

Example 5

The following examples further describe and demonstrate embodiments within the scope of the disclosure. The examples are given solely for the purpose of illustration and are not to be construed as limitations of the present invention, as many variations thereof are possible without departing from the spirit and scope of the disclosure. Table 6 and Table 7 illustrate dry or semi-moist compositions having the following components at the approximate indicated amounts which can be prepared using methods which are standard in the art, including extrusion, and are suitable for feeding to dogs and/or cats as a daily feed.

TABLE 6

Pet food compositions comprising the herein disclosed plant protein ingredient (Processed BSG)

| | % Composition (dry matter basis) | | | | | |
|---|---|---|---|---|---|---|
| Component | Comparative Ex. A | Ex. B | Ex. C | Ex. D | Ex. E | Ex. F |
| Processed BSG* | 0 | 5 | 12 | 17 | 22 | 26 |
| Animal proteins (Meat and meat by-product meals sourced from chicken, beef, lamb, pork, or fish) | 12 | 12 | 12 | 12 | 9 | 5 |
| Plant proteins and soybean by-products (soybean meal, maize gluten) | 11 | 6 | 2 | 2 | 0 | 0 |
| Wholegrain cereals and by-products (corn, rice, wheat, sorghum) | 67 | 67 | 64 | 59 | 59 | 59 |
| Fats and oils | 5 | 5 | 5 | 5 | 5 | 5 |
| Minors** | 5 | 5 | 5 | 5 | 5 | 5 |

*Processed BSG is the plant protein ingredient as herein disclosed
**Minors may include: Vitamin E, beta-carotene, Vitamin A, Ascorbic Acid, Calcium Pantothenate, Biotin, Vitamin $B_{12}$, Vitamin $B_1$, Niacin, Vitamin $B_2$, Vitamin $B_6$, Vitamin $D_3$, Vitamin $D_2$, Folic Acid, Choline Chloride, Inositol, Calcium Carbonate, Dicalcium Phosphate, Potassium Chloride, Sodium Chloride, Zinc Oxide, Manganese Sulfate, Copper Sulfate, Manganous Oxide, Ferrous Sulfate, Potassium Iodide, Cobalt Carbonate, methionine, flavours, fish oil, flax seed, flax meal, cellulose, flavors, antioxidants, taurine, yeast, carnitine, chondroitin sulfate, glucosamine, lutein, rosemary extract, cellulose, sugar beet pulp, chicory root, chicory root pulp, bran

TABLE 7

Pet food compositions comprising the herein disclosed plant protein ingredient (Processed BSG)

| | % Composition (dry matter basis) | | | | | | | |
|---|---|---|---|---|---|---|---|---|
| Component | Comparative Ex. A | Ex. B | Ex. C | Ex. D | Ex. E | Ex. F | Ex. G | Ex. H |
| Processed BSG* | 0 | 5 | 12 | 17 | 22 | 26 | 34 | 42 |
| Animal proteins (Meat and meat by-product meals sourced from chicken, beef, lamb, pork, or fish) | 20 | 20 | 20 | 20 | 17 | 13 | 9 | 6 |
| Plant proteins and soybean by-products (soybean meal, maize gluten) | 24 | 23 | 22 | 19 | 17 | 17 | 13 | 11 |
| Wholegrain cereals and by-products (corn, rice, wheat, sorghum) | 46 | 42 | 36 | 34 | 34 | 34 | 34 | 30 |
| Fats and oils | 5 | 5 | 5 | 5 | 5 | 5 | 5 | 5 |
| Minors** | 5 | 5 | 5 | 5 | 5 | 5 | 5 | 5 |

*Processed BSG is the plant protein ingredient as herein disclosed
**Minors may include: Vitamin E, beta-carotene, Vitamin A, Ascorbic Acid, Calcium Pantothenate, Biotin, Vitamin $B_{12}$, Vitamin $B_1$, Niacin, Vitamin $B_2$, Vitamin $B_6$, Vitamin $D_3$, Vitamin $D_2$, Folic Acid, Choline Chloride, Inositol, Calcium Carbonate, Dicalcium Phosphate, Potassium Chloride, Sodium Chloride, Zinc Oxide, Manganese Sulfate, Copper Sulfate, Manganous Oxide, Ferrous Sulfate, Potassium Iodide, Cobalt Carbonate, methionine, flavours, fish oil, flax seed, flax meal, cellulose, flavors, antioxidants, taurine, yeast, carnitine, chondroitin sulfate, glucosamine, lutein, rosemary extract, cellulose, sugar beet pulp, chicory root, chicory root pulp, bran

The invention claimed is:

1. A food composition comprising a plant protein ingredient derived from Brewer's Spent Grain, wherein said plant protein ingredient has a particle size of less than 105 microns and a protein content of at least about 45% by weight based on the dry weight of the plant protein ingredient,
   wherein the plant protein ingredient has a moisture content of from about 5% to about 30% by weight, and
   wherein said food composition comprises between about 5% and about 70% by weight, of the plant protein ingredient based on the dry weight of the food composition.

2. The food composition of claim 1, wherein said food composition comprises between about 5% and about 50% by weight, of the plant protein ingredient based on the dry weight of the food composition.

3. The food composition of claim 1, wherein the plant protein ingredient has a protein content of at least about 50% by weight based on the dry weight of the plant protein ingredient.

4. The food composition of claim 1, wherein the plant protein ingredient has a crude fibre content of less than about 10% by weight based on the dry weight of the plant protein ingredient.

5. The food composition of claim 1, wherein the plant protein ingredient has a moisture content of from about 5% to about 20% by weight.

6. The food composition of claim 1, wherein the food composition is a pet food composition.

7. A method of making a food composition comprising combining the plant protein ingredient of claim 1, with at least one other ingredient.

8. A method of making a plant protein ingredient comprising the following steps:
   (a) processing Brewer's Spent Grain so as to reduce the particle size, and
   (b) separating the processed Brewer's Spent Grain into fractions,
   wherein the plant protein ingredient comprises at least one of the fractions with a particle size of less than 105 microns,
   wherein the less than 105 micron particle size fraction has a protein content of at least about 45% by weight based on the dry weight of the plant protein ingredient; and
   wherein the moisture content of the Brewer's Spent Grain is adjusted to between about 10% to about 30% by weight either before, during or after step (a).

9. A method of making a plant protein ingredient comprising the following steps:
   (a) adjusting the moisture content of a Brewer's Spent Grain to between about 10% to about 30% by weight,
   (b) processing the adjusted Brewer's Spent Grain so as to reduce the particle size, and
   (c) separating the processed Brewer's Spent Grain into fractions, wherein the plant protein ingredient comprises at least one of the fractions with a particle size of less than 105 microns and wherein the less than 105 micron particle size fraction has a protein content of at least about 45% by weight based on the dry weight of the plant protein ingredient.

10. A method of making a plant protein ingredient comprising the following steps:
   (a) providing a Brewer's Spent Grain with a moisture content of less than about 10% by weight,
   (b) hydrating the Brewer's Spent Grain to a moisture content of between about 10% and about 30% by weight,
   (c) processing the hydrated Brewer's Spent Grain so as to reduce the particle size, and
   (d) separating the processed Brewer's Spent Grain into fractions, wherein the plant protein ingredient comprises at least one of the fractions with a particle size of less than 105 microns and wherein the less than 105 micron particle size fraction has a protein content of at least about 45% by weight based on the dry weight of the plant protein ingredient.

11. The method of claim 8, wherein the yield of particles having a particle size of less than 105 microns is greater than 10% by weight based on the weight of the Brewer's Spent Grain.

12. The method of claim 8, wherein the processing of the hydrated Brewer's Spent Grain and the separating of the processed Brewer's Spent Grain are performed more than one time.

13. A plant protein ingredient produced according to the method of claim 8.

14. A food composition prepared from the plant protein ingredient of claim 13.

15. The method of claim 9, wherein the yield of particles having a particle size of less than 105 microns is greater than 10% by weight based on the weight of the Brewer's Spent Grain.

16. The method of claim 9, wherein the processing of the hydrated Brewer's Spent Grain and the separating of the processed Brewer's Spent Grain are performed more than one time.

17. A plant protein ingredient produced according to the method of claim 9.

18. The method of claim 10, wherein the yield of particles having a particle size of less than 105 microns is greater than 10% by weight based on the weight of the Brewer's Spent Grain.

19. The method of claim 10, wherein the processing of the hydrated Brewer's Spent Grain and the separating of the processed Brewer's Spent Grain are performed more than one time.

\* \* \* \* \*